(12) United States Patent
Takishima

(10) Patent No.: US 10,855,628 B2
(45) Date of Patent: Dec. 1, 2020

(54) INFORMATION PROCESSING SYSTEM, INFORMATION PROCESSING APPARATUS, AND INFORMATION PROCESSING METHOD

(71) Applicant: Naoki Takishima, Kanagawa (JP)

(72) Inventor: Naoki Takishima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/699,250

(22) Filed: Nov. 29, 2019

(65) Prior Publication Data

US 2020/0177528 A1   Jun. 4, 2020

(30) Foreign Application Priority Data

Nov. 30, 2018 (JP) ................... 2018-226143
Oct. 17, 2019 (JP) ................... 2019-190483

(51) Int. Cl.
*G06F 15/16* (2006.01)
*H04L 12/58* (2006.01)

(52) U.S. Cl.
CPC ................... *H04L 51/02* (2013.01)

(58) Field of Classification Search
CPC ....................................................... H04L 51/02
See application file for complete search history.

(56) References Cited

U.S. PATENT DOCUMENTS

| | | | |
|---|---|---|---|
| 6,327,446 B1 * | 12/2001 | Suzuki | G03G 15/5075 399/11 |
| 8,310,960 B2 * | 11/2012 | Nakamura | H04L 67/1002 370/276 |
| 8,780,920 B2 * | 7/2014 | Bahr | H04L 45/48 370/395.2 |
| 9,626,267 B2 * | 4/2017 | Park | G06F 11/263 |
| 10,013,980 B2 * | 7/2018 | Borsutsky | G10L 15/22 |
| 10,419,610 B2 * | 9/2019 | Dahan | G10L 25/51 |
| 10,521,991 B1 * | 12/2019 | Cameron | G07C 9/32 |
| 2017/0230312 A1 * | 8/2017 | Barrett | H04L 51/02 |
| 2018/0025726 A1 * | 1/2018 | Gatti de Bayser | G10L 15/22 704/257 |

(Continued)

FOREIGN PATENT DOCUMENTS

| | | |
|---|---|---|
| JP | 2011-058131 | 3/2011 |
| JP | 2018-092585 | 6/2018 |

*Primary Examiner* — Moustafa M Meky
(74) *Attorney, Agent, or Firm* — Harness, Dickey & Pierce, P.L.C.

(57) ABSTRACT

An information processing apparatus configured to receive message information from a terminal device, and transmit responding message information to the terminal device based on setting information in which query information and answer information are associated with each other, switch a state between a first state and a second state, the first state being a state in which the message information is to be received from the terminal device and a change of the setting information is to be received, the second state being a state in which the message information is not to be received and a change of the setting information is to be received, and when switching from the second state to the first state is performed, transmit the responding message information based on the setting information for which the change has been received in the second state before the switching is performed.

18 Claims, 14 Drawing Sheets

(56) References Cited

U.S. PATENT DOCUMENTS

| | | | |
|---|---|---|---|
| 2018/0054524 A1* | 2/2018 | Dahan | G10L 15/26 |
| 2018/0121808 A1* | 5/2018 | Ramakrishna | H04L 51/02 |
| 2018/0227251 A1 | 8/2018 | Takishima et al. | |
| 2020/0076948 A1* | 3/2020 | Dahan | H04M 7/0045 |
| 2020/0134951 A1* | 4/2020 | Cameron | G07C 9/32 |

* cited by examiner

QUERY DB

| ID | QUERY | ANSWER |
|---|---|---|
| 1 | HOW TO WRITE PATENT SPECIFICATION | VIEW HERE, URL |
| 2 | HOW TO PURCHASE PC | VIEW HERE, URL |
| 3 | HOW TO DISCARD PC | VIEW HERE, URL |

FIG.5

| | SERVICE TYPE | DESCRIPTIONS OF FUNCTIONS | | PRICE A>B>C> D>E>F> G>H>I> J>K | ACTIVATED STATE | DEACTIVATED STATE | ONLY ADMINISTRATOR TOOL IS ACTIVATED |
|---|---|---|---|---|---|---|---|
| 1 | APP SERVICE | APPLICATION SERVER | WEB SERVER | B | ○ | ○ | ○ |
| 2 | CHAT SERVICE | BOT FRAME WORK | LIBRARY GROUP FOR IMPLEMENTING CHATBOT FUNCTION | G | ○ | – | |
| 3 | ADMINISTRATOR TOOL | PROVIDE WEBUI OF ADMINISTRATOR TOOL | WEB APPLICATION IMPLEMENTED ON APP SERVICE | | ○ | ○ | ○ |
| 4 | FIRST DB | DATABASE | EXCELLENT FOR STRUCTURED DATA FOR STORING SETTING DATA, SUCH AS Q&A | D | ○ | – | ○ |
| 5 | CONTENT DISTRIBUTION SERVICE | CONTENT DISTRIBUTION | DISTRIBUTE UI CONTENTS OF CHATBOT | K | ○ | – | ○ |
| 6 | SEARCH ENGINE | SEARCH ENGINE | NOT ONLY FUNCTION TO PERFORM DB SEARCH BUT ALSO FUNCTION TO ANALYZE DOCUMENT INPUT BY USER AND GENERATE SEARCH TEXT FOR DB SEARCH BASED ON PREDETERMINED ALGORITHM | A | ○ | – | – |
| 1 | ENCRYPTION FUNCTION | ENCRYPTION | FOR ACCESS TO MANAGEMENT TOOL → INCLUDED IN APP SERVICE | J | ○ | ○ | ○ |
| 7 | STORAGE SERVICE | CLOUD STORAGE | UI CONTENTS OF CHATBOT | I | ○ | ○ | ○ |
| 1 | DNS MANAGEMENT FUNCTION | DNS | FOR ACCESS TO MANAGEMENT TOOL → INCLUDED IN APP SERVICE | H | ○ | ○ | ○ |
| 8 | SECOND DB | DATABASE | HISTORY DATA AND LOG DATA ARE STORED EXCELLENT FOR UNSTRUCTURED DATA | C | ○ | – | ○ |
| 1 | SECURITY FUNCTION | SECURITY | FOR ACCESS TO MANAGEMENT TOOL → INCLUDED IN APP SERVICE | E | ○ | ○ | ○ |
| 1 | SSL CERTIFICATE FUNCTION | CERTIFICATE | FOR ACCESS TO MANAGEMENT TOOL → INCLUDED IN APP SERVICE | F | ○ | ○ | ○ |

FIG.7

| TENANT ID | STATE |
|---|---|
| CORPORATION A | DEACTIVATED |
| CORPORATION B | ACTIVATED |
| CORPORATION C | ACTIVATED |

FIG.10

| NUMBER OF TENANTS CAPABLE OF BEING HANDLED | 100 |
|---|---|

| TENANT LIST | TENANT A |
| | TENANT B |
| | TENANT C |
| | ... |
| NUMBER OF USING TENANTS | 99 |

| TENANT ID | STATE | ACTIVATION PERIOD |
|---|---|---|
| CORPORATION A | DEACTIVATED | DECEMBER 1$^{ST}$ TO JANUARY 31$^{ST}$ |
| CORPORATION B | ACTIVATED | — |
| CORPORATION C | ACTIVATED | OCTOBER 1$^{ST}$ TO NOVEMBER 30$^{TH}$ |

FIG.17

| TENANT ID | STATE | ACTIVATION PERIOD | PREPARATION PERIOD |
|---|---|---|---|
| CORPORATION A | ACTIVATED STATE 1 (ONLY ADMINISTRATOR TOOL) | DECEMBER 1$^{ST}$ TO JANUARY 31$^{ST}$ | NOVEMBER 1$^{ST}$ TO NOVEMBER 30$^{TH}$ |
| CORPORATION B | DEACTIVATED | — | — |
| CORPORATION C | ACTIVATED STATE 2 (ALL FUNCTIONS) | OCTOBER 1$^{ST}$ TO NOVEMBER 30$^{TH}$ | — |

# INFORMATION PROCESSING SYSTEM, INFORMATION PROCESSING APPARATUS, AND INFORMATION PROCESSING METHOD

CROSS-REFERENCE TO RELATED APPLICATIONS

The present application claims priority under 35 U.S.C. § 119 to Japanese Patent Application No. 2018-226143, filed on Nov. 30, 2018 and Japanese Patent Application No. 2019-190483, filed on Oct. 17, 2019. The contents of which are incorporated herein by reference in their entirety.

BACKGROUND OF THE INVENTION

1. Field of the Invention

The present invention relates to an information processing system, an information processing apparatus, and an information processing method.

2. Description of the Related Art

In recent years, what is called a chatbot has been known, in which pattern recognition of text, voice, or images input by a user is performed via cloud computing and conversations, answering to queries, apparatus control, and the like are conducted. As the chatbot, a choice-based chatbot for conducting conversations in a selective manner based on a predetermined scenario, a dictionary-based chatbot for giving registered words and responses to the registered words, a log-based chatbot for giving context-based responses using a conversation log have been known.

Further, Japanese Unexamined Patent Application Publication No. 2018-92585 discloses an information processing method for identifying and providing information desired by a user by automatically conducting a conversation (chat) with the user based on registered information that is registered in advance.

However, a conventional chatbot system does not allow an operator side and a contractor side to switch between an activated state and a deactivated state of the chatbot system, and therefore, it is difficult to flexibly cope with a use mode or the like as desired by the contractor side.

SUMMARY OF THE INVENTION

According to one aspect of the present invention, an information processing apparatus comprising circuitry configured to receive message information from a terminal device, and transmit responding message information to the terminal device based on setting information in which query information and answer information are associated with each other, receive change operation for changing at least one of the query information and the answer information included in the setting information, switch a state between a first state and a second state, the first state being a state in which the message information is to be received from the terminal device and a change of the setting information is to be received, the second state being a state in which the message information is not to be received and a change of the setting information is to be received, and when switching from the second state to the first state is performed, transmit the responding message information to the terminal device based on the setting information for which the change has been received in the second state before the switching is performed.

BRIEF DESCRIPTION OF THE DRAWINGS

FIG. 5 is a diagram for explaining each of functions of a cloud platform;

FIG. 7 is a diagram illustrating an example of tenant identification information that is stored in a tenant state table;

FIG. 10 is a diagram illustrating the number of tenants that can be handled by the chatbot system according to the embodiment;

FIG. 17 is a diagram illustrating a modification of the second embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
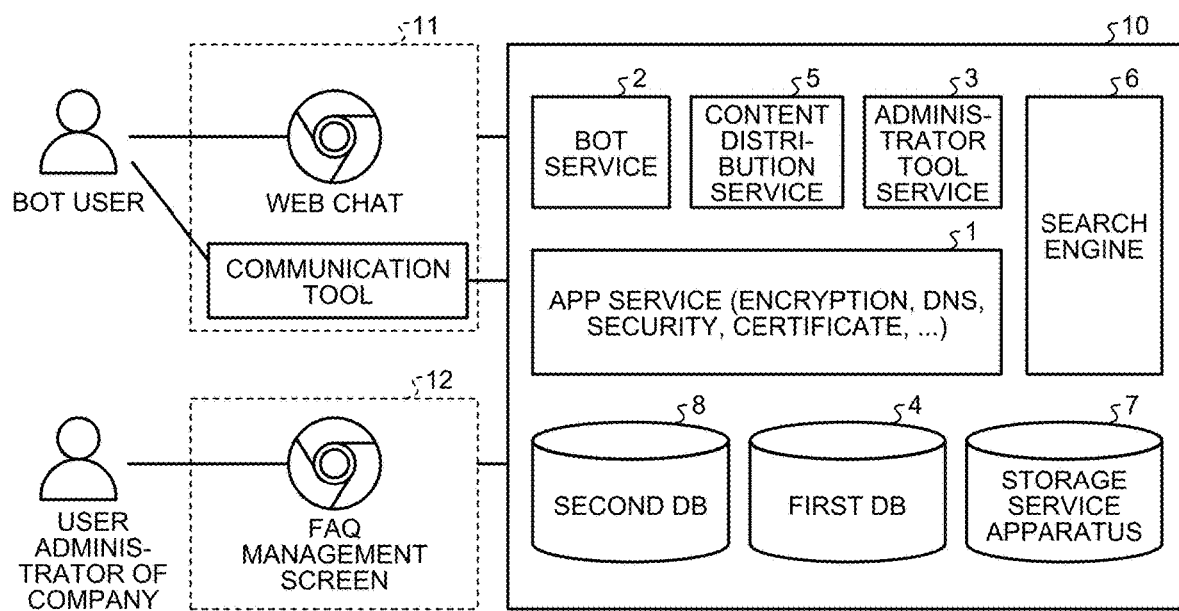
FIG. 1 is a system configuration diagram of a chatbot system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an information processing system, an information processing apparatus, and an information processing method capable of switching between an activated state and a deactivated state of a chatbot system and flexibly coping with a use mode as desired by a contractor side.

Embodiments of a chatbot system as an example of application of an information processing system, an information processing apparatus, an information processing method, and an information processing program will be described below.

System Configuration

FIG. 1 is a system configuration diagram of a chatbot system according to an embodiment. As illustrated in FIG. 1, the chatbot system according to the embodiment includes a cloud platform 10, a personal computer 11 of a user of the chatbot system, and a personal computer 12 of an administrator of a company or the like in which the chatbot system is installed. In FIG. 1, the single cloud platform 10, the single personal computer 11, and the single personal computer 12 are illustrated, but the number of each of the apparatuses may be plural.

The personal computer 11 of the user of the chatbot system is a terminal device on which the user views a homepage and conducts a chat or a terminal device on which the user conducts a chat using an installed communication tool.

As one example, the cloud platform 10 includes an application software (APP) service server apparatus 1, a bot service server apparatus 2, an administrator tool service server apparatus 3, a first database 4, a content distribution service server apparatus 5, a search engine 6, a storage service apparatus (Storage) 7, and a second database 8.

Each of the apparatuses 1 to 8 of the cloud platform 10 as described above may be implemented by a single server apparatus or it may be possible to provide a server apparatus for each of the services. Further, it may be possible to adopt a configuration in which a configuration for implementing a single service by a single server apparatus and a configuration for implementing a plurality of services by a single server apparatus are mixed. Furthermore, it may be possible to implement a single service by a distribution process using a plurality of server apparatuses.

Figure 2:
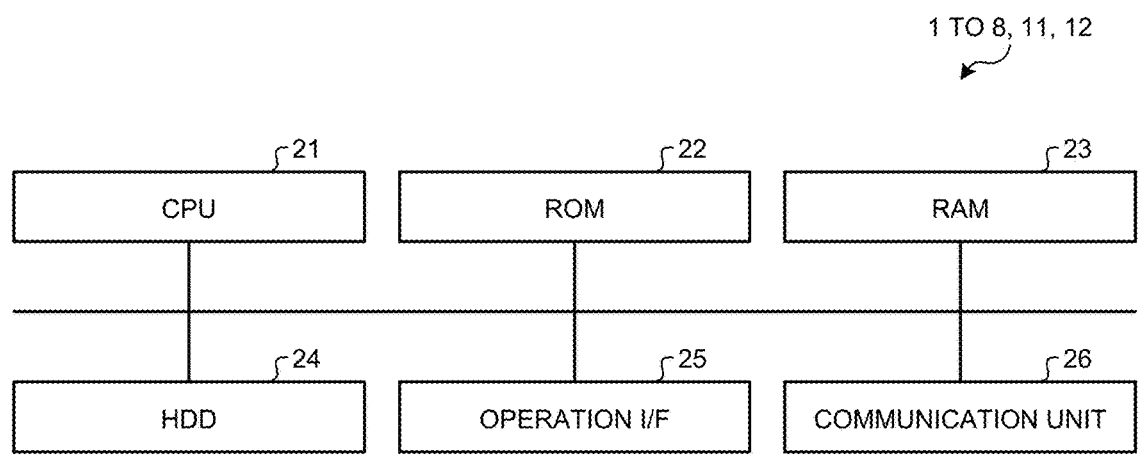
FIG. 2 is a block diagram of each of units included in the chatbot system according to the embodiment.

FIG. 2 is a block diagram of each of the apparatuses 1 to 8 of the cloud platform 10. As illustrated in FIG. 2, each of the apparatuses 1 to 8 includes a central processing unit (CPU) 21, a read only memory (ROM) 22, a random access memory (RAM) 23, a hard disk drive (HDD) 24, an operation interface (I/F) 25, and a communication unit 26. The HDD stores therein an information processing program for controlling switch between activation and deactivation of the chatbot system as will be described later.

Figures 3, 4:
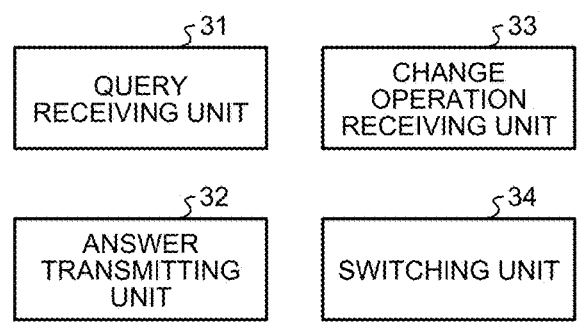
FIG. 3 is a functional block diagram of an APP service server apparatus.
FIG. 4 is a diagram illustrating a specific example of setting data.

FIG. 3 is a functional block diagram of the APP service server apparatus 1 of the cloud platform 10. The CPU 21 of the APP service server apparatus 1, by executing the information processing program stored in the HDD 24, functions as a query receiving unit 31, an answer transmitting unit 32, a change operation receiving unit 33, and a switching unit 34 as illustrated in FIG. 3. The query receiving unit 31 and the answer transmitting unit 32 are one example of a control unit. Further, the change operation receiving unit 33 is one example of a first receiving unit, and the switching unit 34 is one example of a switching unit.

FIG. 5 is a diagram for explaining each of the functions of the cloud platform 10. A service type illustrated in FIG. 5 indicates each of the functions, such as the APP service server apparatus 1 and the bot service server apparatus 2, of the cloud platform 10. Further, a numeral added to the left side of each of the functions is a reference numeral of each of the functions. Specifically, as for the APP service server apparatus 1, a numeral of "1" is added to the left side of "app service", and as for the bot service server apparatus 2, a numeral of "2" is added to the left side of "bot Service".

As illustrated in FIG. 5, the APP service server apparatus 1 of the cloud platform 10 is a Web server apparatus that is generally called a servlet container or a Web container. The APP service server apparatus 1 has a domain name system (DNS) function to associate a domain name and an Internet protocol (IP) address with each other and give an instruction on an electronic mail (e-mail) destination host, for example. Further, the APP service server apparatus 1 has a management function for generation, deletion, import, and the number of times of use of encryption keys and secret keys, for example.

Furthermore, the APP service server apparatus 1 has a function to monitor security between on-premise workloads and cloud workloads. Moreover, the APP service server apparatus 1 has a function to issue a secure sockets layer (SSL) certificate for certifying that data communication on the Internet is encrypted and eavesdropping and falsification can be prevented.

The bot service server apparatus 2 is a library group for implementing the chatbot and is what is called a framework. The administrator tool service server apparatus 3 is a Web application implemented on the APP service server apparatus 1 and provides a Web user interface (WebUI) of an administrator tool. The first database 4 stores therein setting data on queries given to the company and answers (Q&A). The setting data is stored as structured data that is tagged such that the search engine 6 and other crawlers can understand meaning of information written by Hypertext Markup Language (HTML), for example.

FIG. 4 is a diagram illustrating an example of the setting data. As illustrated in FIG. 4, the setting data is data in which a query and an answer are stored in association with each other. In the example illustrated in FIG. 4, a query of "how to write patent specification" is registered with a query identification number (query ID) of "1", and, in association with the query, a message of "view here" for recommending viewing of a uniform resource locator (URL) of a page including explanation on how to write a patent specification and the URL of the page including the explanation on how to write a patent specification are registered. Further, in the example illustrated in FIG. 4, a query of "how to discard personal computer (PC)" is registered with a query ID of "3", and, in association with the query, a message of "view here" for recommending viewing of a URL of a page including explanation on how to discard a PC and the URL of the page including the explanation on how to discard a PC are registered.

The content distribution service server apparatus 5 distributes UI contents of the chatbot. The search engine 6 has a function to search through databases, and a function to analyze a document input by a user and generate a search text for a database based on a predetermined algorithm. The storage service apparatus (Storage) 7 stores therein UI contents of the chatbot. The second database 8 stores therein history data, log data, and the like.

Operation of Embodiment

The chatbot system according to the embodiment is available only during a period in which a company or the like having a contract for the chatbot needs to use the chatbot. During a period in which the chatbot is not used (during deactivation), the setting data and the like are stored. When the chatbot is resumed, the chatbot can smoothly return from the deactivated state on the basis of the stored setting data and the like. It is possible to easily switch between activation and deactivation as described above.

Operation for Switching from Activated State to Deactivated State

Figure 6:
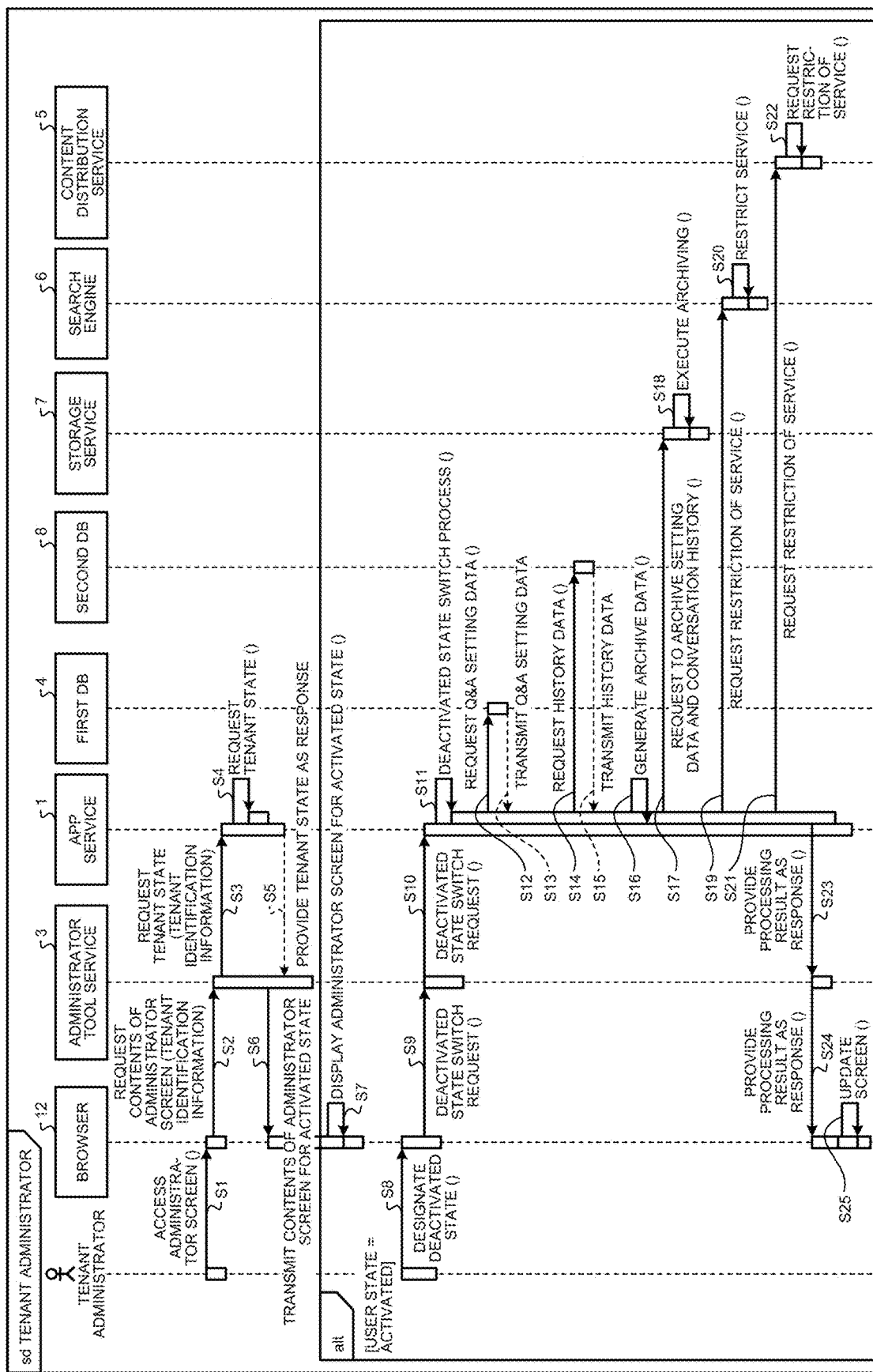
FIG. 6 is a sequence diagram illustrating a flow of system operation for causing a chatbot for which a company has a contract to switch from an activated state to a deactivated state.

FIG. 6 is a sequence diagram illustrating a flow of system operation for causing the chatbot for which a company has a contract to switch from an activated state to a deactivated state. In the sequence diagram in FIG. 6, first, an account administrator in the company performs operation of accessing an administrator screen by operating an operating unit of the personal computer 12 for management (Step S1). A Web browser of the personal computer 12 for management transfers tenant identification information (identification information on the company that has a contract for the chatbot) to the APP service server apparatus 1 via the administrator tool service server apparatus 3 of the cloud platform 10, and requests a tenant state (Step S2 and Step S3).

The APP service server apparatus 1 refers to a tenant state table stored in the "first database" on the basis of the transferred tenant identification information, and detects a tenant state corresponding to the tenant identification information (Step S4). FIG. 7 is a diagram illustrating an example of the tenant identification information stored in the tenant state table. In the example illustrated in FIG. 7, it is indicated that the chatbot is deactivated in a corporation A, the chatbots are activated (used) in a corporation B and a corporation C. The APP service server apparatus 1 transmits tenant state information indicating the detected tenant state to the Web browser of the personal computer 12 for management via the administrator tool service server apparatus 3 (Step S5 and Step S6).

Figure 8:
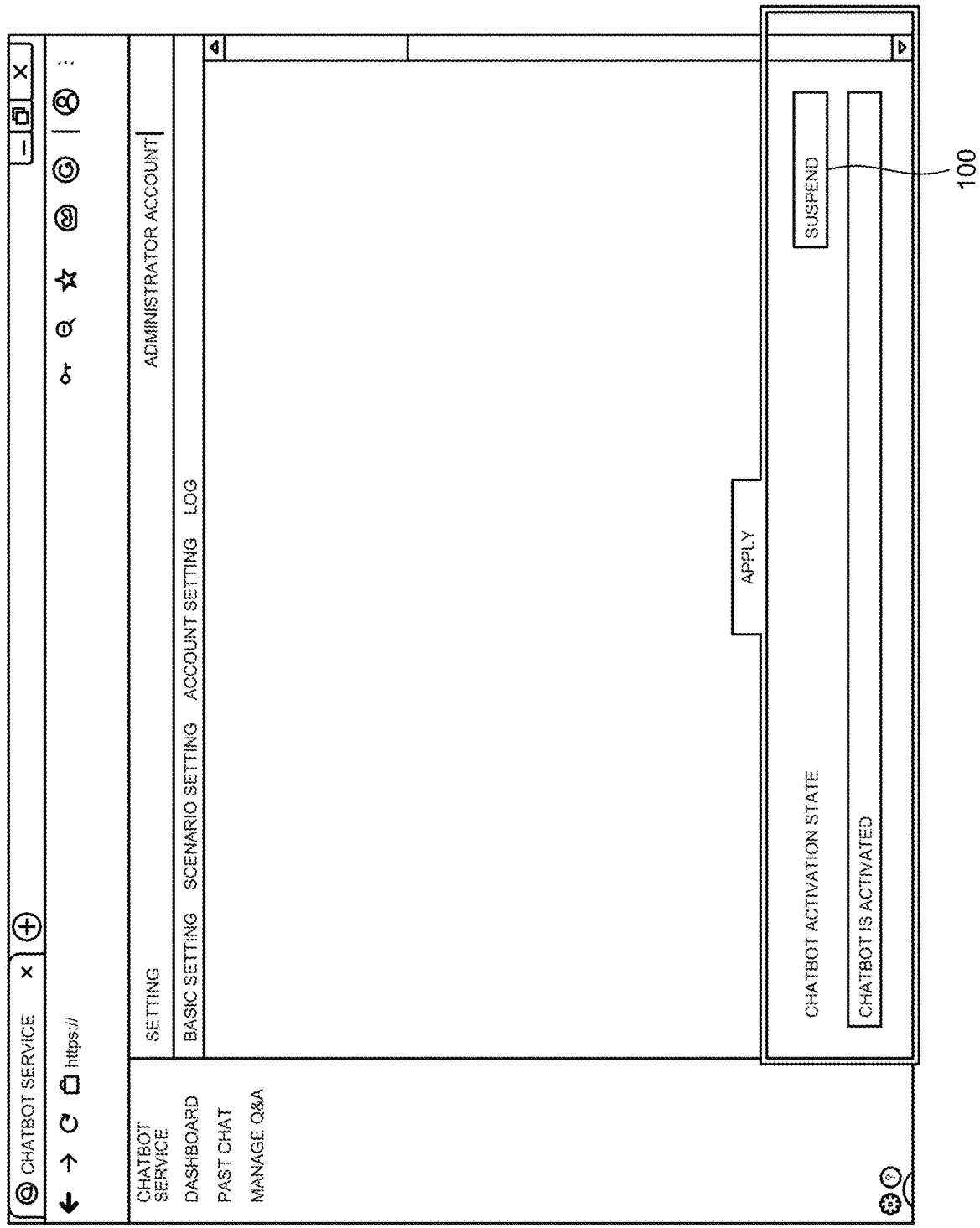
FIG. 8 is a diagram illustrating an example of an administrator screen in a case where the chatbot system is activated.

Upon receiving the tenant state information indicating that the chatbot is currently activated (used), the personal computer 12 for management displays an administrator screen for an activated state on a display unit via the Web browser (Step S7). FIG. 8 is a diagram illustrating an example of the administrator screen for the activated state. As illustrated in FIG. 8, on the administrator screen for the activated state, for example, a message, such as "chatbot is activated", indicating that the chatbot is activated, and a deactivation button 100 for causing the activated chatbot system to switch to a deactivated state are displayed.

Subsequently, if the account administrator causes the activated chatbot system to switch to the deactivated state, the account administrator operates the deactivation button 100 displayed on the administrator screen for the activated state as illustrated in FIG. 8 (Step S8). Accordingly, a deactivated state switch request for causing the chatbot system to switch to the deactivated state is transmitted to the APP service server apparatus 1 via the Web browser of the personal computer 12 for management (Step S9 and Step S10). Upon receiving the deactivated state switch request, the APP service server apparatus 1 starts to perform a deactivated state switch process (Step S11).

Specifically, the APP service server apparatus 1 performs processes as described below by causing a processor (CPU) to operate based on the information processing program stored in a storage unit, such as a hard disk drive or a semiconductor storage device. More specifically, upon starting the deactivated state switch process, the APP service server apparatus 1 requests the first database 4 to provide Q&A setting data that is setting data on a query given to the company from a user and an answer to the query (Step S12). The first database 4 transmits the requested Q&A setting data to the APP service server apparatus 1 (Step S13).

Subsequently, the APP service server apparatus 1 requests the second database 8 to provide history data on conversations with the user or the like (Step S14). The second database 8 transmits the requested history data to the APP service server apparatus 1 (Step S15).

Subsequently, the APP service server apparatus 1 starts to generate archive data on the Q&A setting data and the history data acquired as above (Step S16). Specifically, the APP service server apparatus 1 transmits the Q&A setting data and the history data to the storage service apparatus 7 and requests to archive the data (Step S17). The storage service apparatus 7 archives and stores therein the Q&A setting data and the history data (Step S18).

Meanwhile, the chatbot system according to the embodiment has, as modes (states) to be adopted during the deactivated state, a "first state" in which a chat function for general users is deactivated but a management function for the administrator is continuously activated, and a "second state" in which both of the chat function for general users and the management function for the administrator are deactivated.

In a case of switching from the activated state to the "second state" in which both of the chat function for general users and the management function for the administrator are deactivated, the processes from Step S12 to Step S18 for archiving the data are performed.

However, in a case of switching from the activated state to the "first state" in which the chat function for general users is deactivated but the management function for the administrator is continuously activated, because the Q&A setting data and the history data are used in the management function for the administrator, the processes from Step S12 to Step S18 for archiving the data are not needed.

Further, in a case of switching from the "first state" in which the chat function for general users is deactivated but the management function for the administrator is continuously activated to the "second state" in which both of the functions are deactivated, the processes from Step S12 to Step S18 are performed and the Q&A setting data and the history data are archived.

Meanwhile, in a case of switching to the "first state" in which the chat function for general users is deactivated but the management function for the administrator is continuously activated, it may be possible to archive either one of the Q&A setting data and the history data. If the Q&A setting data is to be archived, the processes at Step S14 and Step S15 for acquiring the history data are not needed. Further, if the history data is to be archived, the processes at Step S12 and Step S13 for acquiring the Q&A setting data are not needed.

Subsequently, the APP service server apparatus 1 requests the search engine 6 to restrict a search service (Step S19), and requests the content distribution service server apparatus 5 to restrict a content distribution service (Step S21). The search engine 6 and the content distribution service server apparatus 5 deactivate the search service and the content distribution service for the company that has issued restriction requests (Step S20 and Step S22).

Subsequently, the APP service server apparatus 1 generates a response screen as a screen of a result that is obtained by processing the requests issued by the administrator, and transmits the response screen to the personal computer 12 of the administrator via the administrator tool service server apparatus 3 (Step S23 and Step S24). The personal computer 12 of the administrator displays, on the display unit, the response screen that is a result of a chatbot system deactivation request (Step S25).

At Step S8 in FIG. 6, by operating the deactivation button 100 as illustrated in FIG. 8, it is possible to switch from the activated state to the first state in which the management function for the administrator is continuously activated. In contrast, in the second state in which both of the chat function for general users and the management function for the administrator are deactivated, the management function for the administrator enters the deactivated state. Therefore, an administrator screen for a deactivated state as illustrated in FIG. 9 is not displayed, and it becomes difficult to return from the second state to the first state or the activated state.

To prevent inconvenience as described above, the personal computer 12 for management operates as described below. Specifically, if the administrator screen (administrator tool) for the activated state of the chatbot system as illustrated in FIG. 8 is operated, the personal computer 12 for management performs switching from the activated state to the first state. In contrast, switching from the first state or the activated state to the second state is performed such that a state of a specific tenant is switched to the second state when an administrator or the like on the system distribution side gives designation via a dedicated UI or a tool.

Therefore, only when intentional designation is given via the dedicated UI or the tool, it is possible to perform switching to the second state in which both of the chat function for general users and the management function for the administrator are deactivated. In this case, return from the second state to the first state or the activated state is performed at a timing desired by the administrator or the like.

Figure 9:
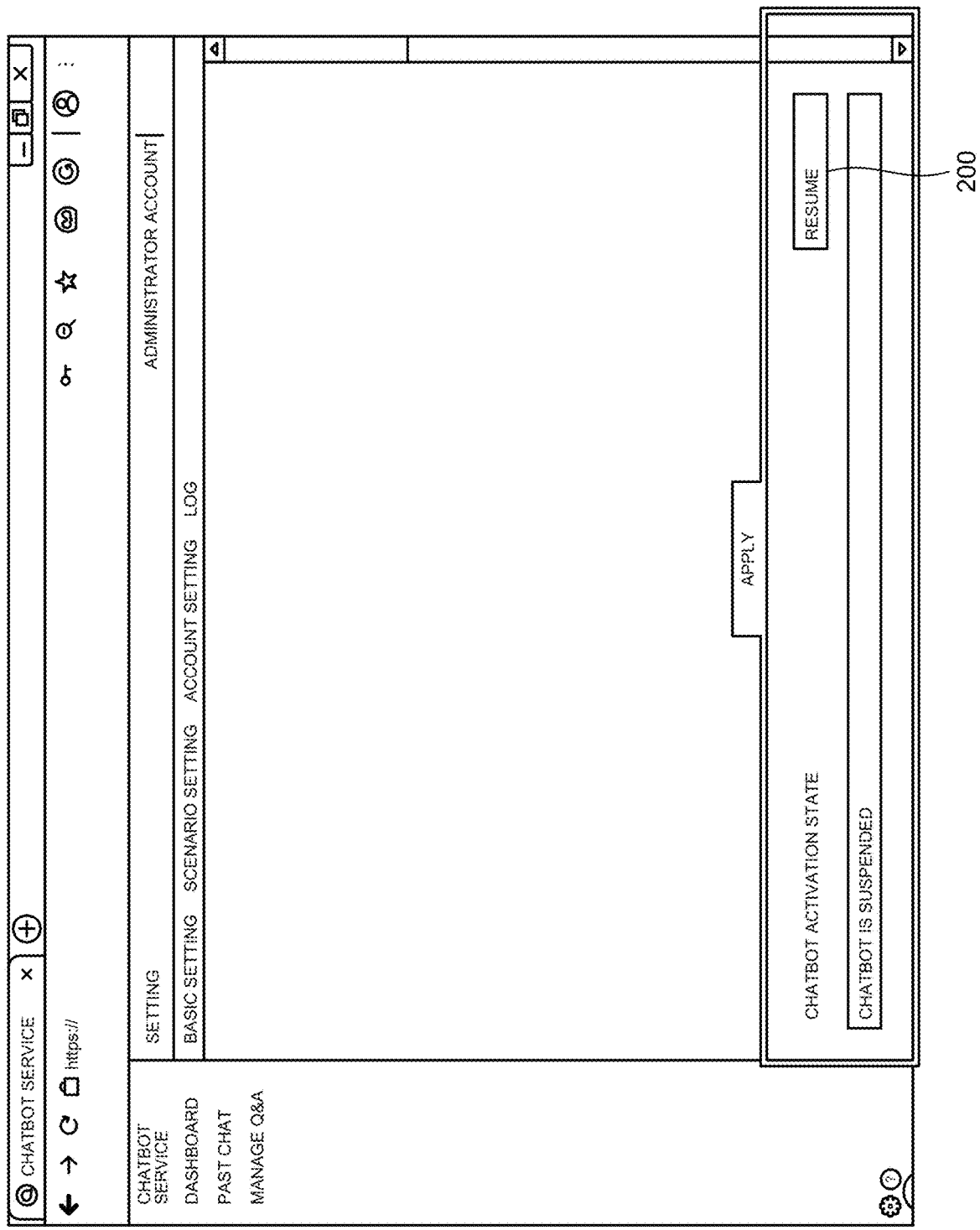
FIG. 9 is a diagram illustrating an example of the administrator screen in a case where the chatbot system is deactivated.

Alternatively, the personal computer 12 for management may maintain a minimum function for switching the management screen (state) illustrated in FIG. 8 and FIG. 9, instead of completely deactivating an administrator tool service when switching to the second state. Accordingly, even after switching to the second state, the administrator or the like can freely switch among the states. In this case, by allowing selection of a state to be switched from among the three states in the management screen as illustrated in FIG. 8 and FIG. 9, it is possible to improve operability.

FIG. 9 is a diagram illustrating an example of the response screen. FIG. 9 illustrates an example of a response screen that is obtained when the chatbot system switches from the activated state to the deactivated state. If the chatbot system switches from the activated state to the deactivated state, as illustrated in FIG. 9 for example, a message of "chatbot is suspended" indicating that the service is suspended is displayed. Further, together with this message, a resume button 200 that is to be operated when the chatbot system is to be resumed is displayed.

Effects Obtained by Causing the Chatbot System to Enter the Deactivated State

By temporarily deactivating the chatbot system as described above, the company side and the chatbot system provider side can achieve effects as described below. Specifically, as illustrated in FIG. 5, fees that the company side pay by activating the chatbot system equal to a sum of fees as listed below. Meanwhile, prices illustrated in FIG. 5 are determined such that A>B>C>D>E>F>G>H>I>J>K, in which the price A is the highest and the price K is the lowest.

APP service server apparatus 1→B yen
Bot service server apparatus 2→G yen
First database 4→D yen
Content distribution service server apparatus 5→K yen
Search engine 6→A yen
Encryption function of APP service server apparatus 1→J yen
Storage service apparatus 7→I yen
DNS function of APP service server apparatus 1→H yen
Second database 8→C yen
Security function of APP service server apparatus 1→E yen
SSL certificate issuance function of APP service server apparatus 1→F yen In contrast, if the chatbot system is deactivated, as indicated by a symbol of "-" in FIG. 5, following services for a chat function (information providing function) are deactivated, and the company side can save money corresponding to a sum of the fees of the deactivated services.

Bot service server apparatus 2→G yen
First database 4→D yen
Content distribution service server apparatus 5→K yen
Search engine 6→A yen
Second database 8→C yen In this manner, by switching the chatbot system from the activated state to the deactivated state, it is possible to largely reduce necessary running costs. Meanwhile, it may be possible to deactivate at least the search engine 6. Even in this case, the company side can save money of "A yen" that is the maximum fee.

Further, even if the chatbot system is deactivated as described above, necessary data, such as the Q&A setting data and the history data, are not deleted but archived and stored until next activation. If the chatbot system is used in a mode in which a contract is made for use in a necessary period and the contract is cancelled in an unnecessary period, the setting data and the like are deleted due to the cancellation and need to be set again if the contract is made again. However, by using the deactivated state, the contract is maintained and the setting data and the like are not deleted, so that when the chatbot system is resumed, it is possible to smoothly switch to the activated state without a need of cumbersome operation of re-setting or the like.

Meanwhile, when multiple companies have contracts for the chatbot system, in some cases, one or more of the companies may switch to the deactivated states, for example. In this case, it may be possible to lend use options of the companies in the deactivated states to other new companies. Specifically, as illustrated in FIG. 10, the first database 4 stores therein, for example, information on the number of tenants that can be handled by the chatbot system (for example, 100 companies), a tenant list indicating tenants that currently have contracts for the chatbot system (tenant A, tenant B, . . . ), and the number of tenants that are currently using (activating) the chatbot system, for example. For example, if 100 tenants have contracts for the chatbot system, and one of the tenants stops using the chatbot system, the number of tenants currently using the chatbot system is 99, and a vacancy of 1 company is left.

Meanwhile, the list of tenants currently using the system may be stored by each of services by itself.

In this case, the APP service server apparatus 1 makes setting of each of the units such that a use option of a company in the deactivated state is rent to a new different company. With this configuration, the company that has deactivated the chatbot system can save usage fees, and the chatbot system provider side can charge usage fees of the the chatbot system from the different company that has newly rented the system. Therefore, it is possible to construct a system from which both of the company side using the chatbot system and the provider side providing the chatbot system can receive benefits.

Return Operation from Deactivated State to Activated State

Figure 11:
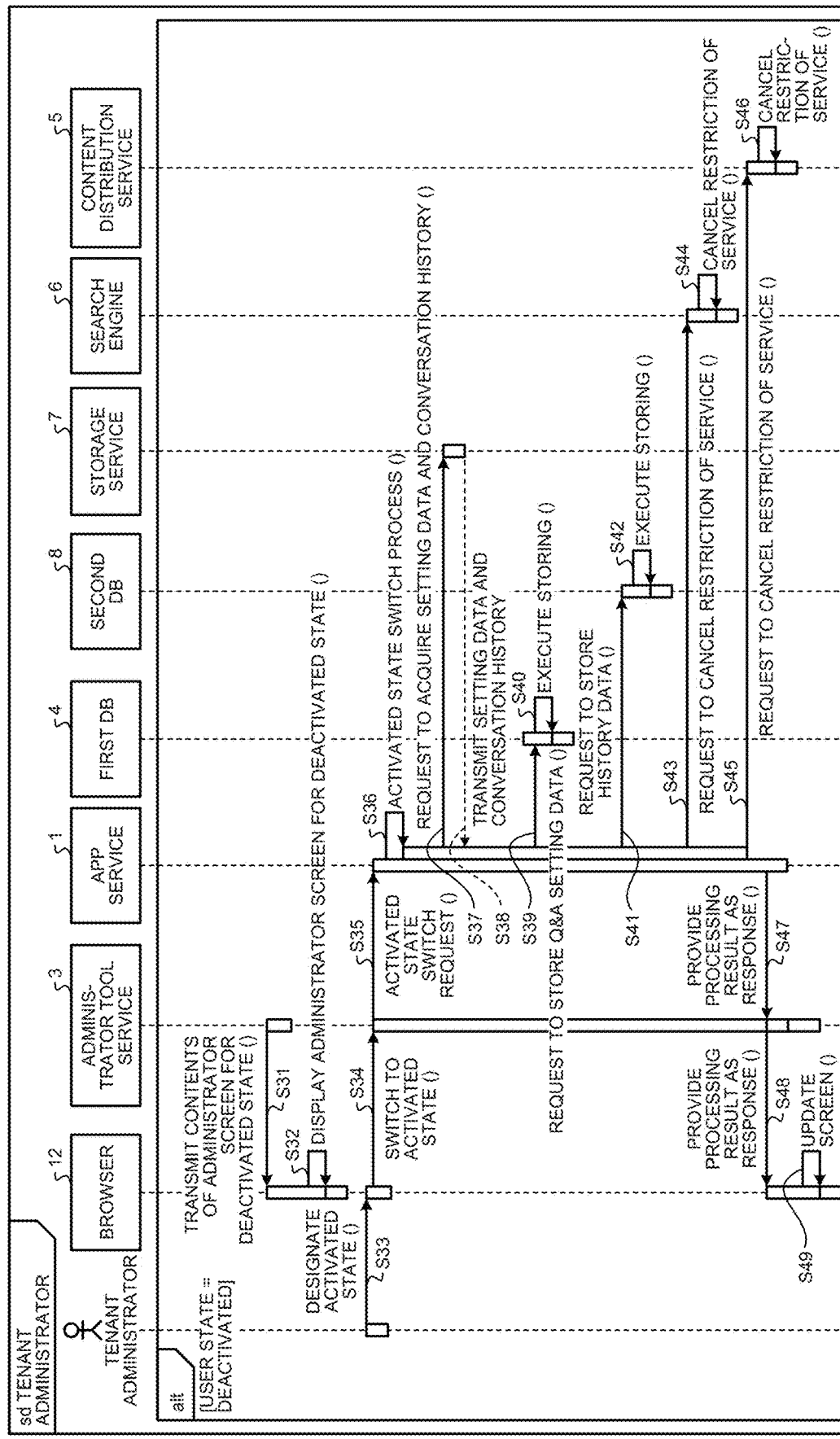
FIG. 11 is a sequence diagram illustrating a flow of system operation for causing a chatbot for which a company has a contract to return from the deactivated state to the activated state.

FIG. 11 is a sequence diagram illustrating a flow of system operation for causing the chatbot for which a company has a contract to return from the deactivated state to the activated state, in reverse with respect to the sequence diagram illustrated in FIG. 6. Even in this case, as described above with reference to the sequence diagram in FIG. 6, the account administrator in the company performs operation of accessing the administrator screen by operating the operating unit of the personal computer 12 for management (Step S1). The Web browser of the personal computer 12 for management transfers the tenant identification information (identification information on the company that has a contract for the chatbot) to the APP service server apparatus 1 via the administrator tool service server apparatus 3 of the cloud platform 10, and requests a tenant state (Step S2 and Step S3).

The APP service server apparatus 1 refers to the first database 4 on the basis of the transferred tenant identification information, and detects a tenant state corresponding to the tenant identification information (Step S4). The APP service server apparatus 1 transmits the tenant state information indicating the detected tenant states to the Web browser of the personal computer 12 for management via the administrator tool service server apparatus 3 (Step S5 and Step S6).

Upon receiving the tenant state information indicating that the chatbot is currently deactivated, the personal computer 12 for management displays the administrator screen for the deactivated state as illustrated in FIG. 9 on the display unit via the Web browser (Step S31 and Step S32).

Subsequently, if the account administrator causes the deactivated chatbot system to switch to the activated state, the account administrator operates the resume button 200 displayed on the administrator screen for the deactivated state as illustrated in FIG. 9 (Step S33). Accordingly, an activated state switch request for causing the chatbot system to switch to the activated state is transmitted to the APP service server apparatus 1 via the Web browser of the personal computer 12 for management (Step S34 and Step S35). Upon receiving the activated state switch request, the APP service server apparatus 1 starts to perform an activated state switch process (Step S36).

Specifically, the APP service server apparatus 1 performs processes as described below by causing the processor (CPU) to operate based on the information processing program stored in the storage unit, such as a hard disk drive or a semiconductor storage device. More specifically, upon starting the activated state switch process, the APP service server apparatus 1 acquires the history data on conversations and the Q&A setting data that are stored in an archived manner from the storage service apparatus 7 (Step S37 and Step S38). Then, the APP service server apparatus 1 transmits and stores the acquired Q&A setting data to and in the first database 4 (Step S39 and Step S40). Further, the APP service server apparatus 1 transmits and stores the acquired history data on conversations to and in the second database 8 (Step S41 and Step S42).

Subsequently, the APP service server apparatus 1 requests the search engine 6 to cancel restrictions of the search service (Step S43), and requests the content distribution service server apparatus 5 to cancel restrictions of the content distribution service (Step S45). The search engine 6 and the content distribution service server apparatus 5 start again to provide the search service and the content distribution service to the company that has issued the requests (Step S44 and Step S46).

Subsequently, the APP service server apparatus 1 generates the response screen as a screen of a result that is obtained by processing the requests issued by the administrator, and transmits the response screen to the personal computer 12 of the administrator via the administrator tool service server apparatus 3 (Step S47 and Step S48). The personal computer 12 of the administrator displays, on the display unit, the response screen as illustrated in FIG. 8 that is a result of the chatbot system activation request (Step S49).

Use Modes of Chatbot System

Figure 12:
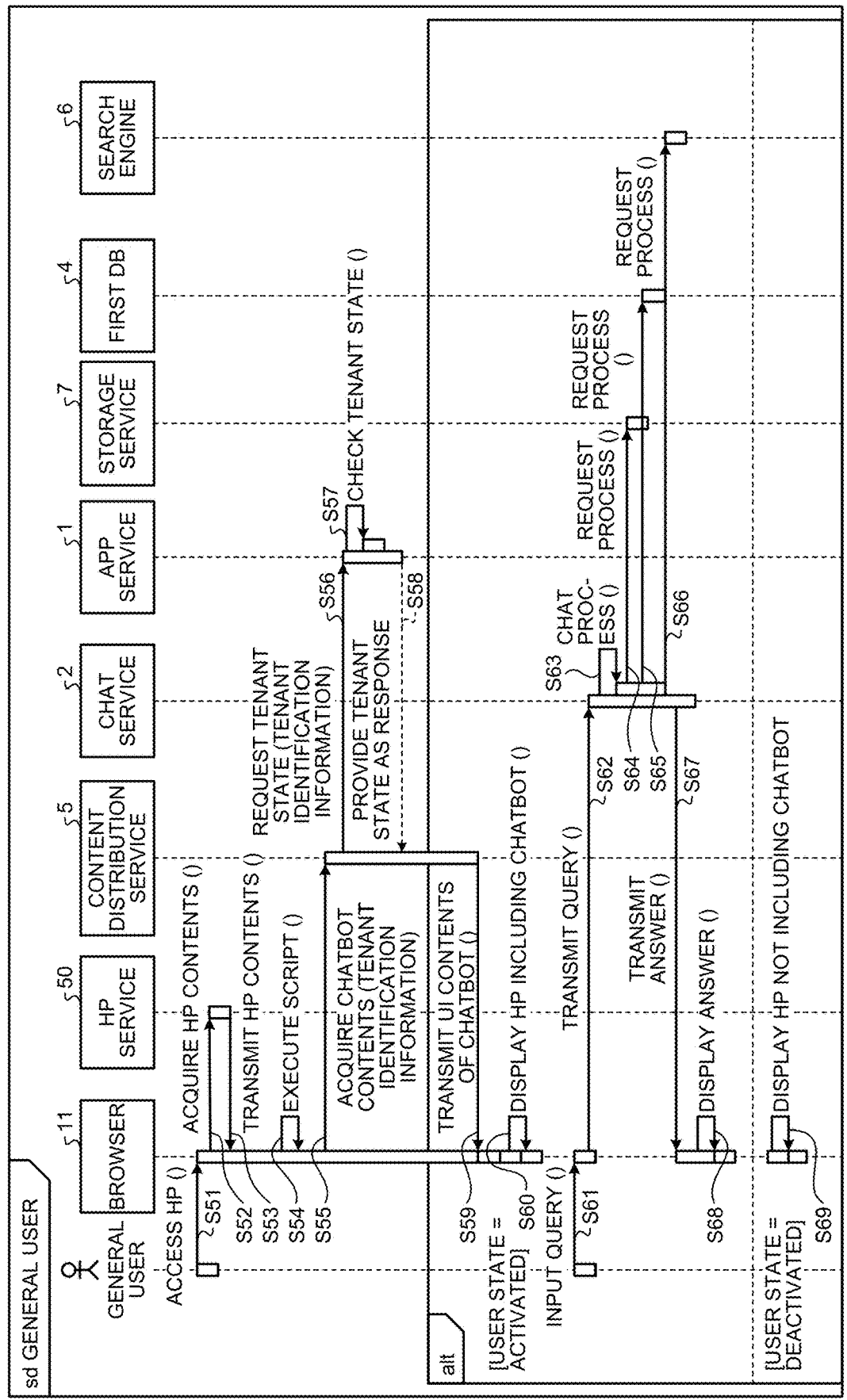
FIG. 12 is a sequence diagram illustrating a flow indicating how a general user uses the chatbot system according to the embodiment.

FIG. 12 is a sequence diagram illustrating a flow indicating how a general user uses the chatbot system according to the embodiment. In FIG. 12, first, the user operates the personal computer 11 and accesses, via a Web browser, a homepage of a company that has a contract for the chatbot system (a server apparatus 50 of the company: HP service) (Step S51). Accordingly, HP contents constituting the homepage of the company are acquired by the personal computer 11 of the user, and displayed on a display unit via the Web browser (Step S52 and Step S53).

Subsequently, the CPU of the personal computer 11 of the user executes a script for the chatbot included in the acquired HP contents (Step S54). Specifically, the CPU transmits the tenant identification information included in the HP contents to the APP service server apparatus 1 and issues a chatbot system content acquisition request via the Web browser (Step S55 and Step S56).

The APP service server apparatus 1 refers to the first database 4 and detects whether a tenant indicated by the received tenant identification information is currently in the activated state or the deactivated state (Step S57: tenant state check). Then, the APP service server apparatus 1 notifies the content distribution service server apparatus 5 of the tenant state (Step S58).

When Tenant is Using Chatbot System (Activated State)

Figure 13:
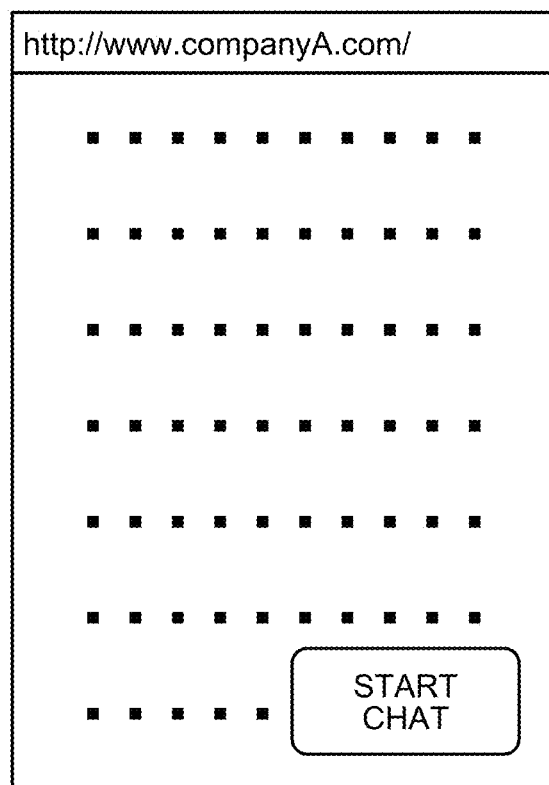
FIG. 13 is a diagram illustrating an example of a homepage that is provided by a company in which the chatbot system is activated and that is displayed on a personal computer on a user side.

If the content distribution service server apparatus 5 is notified of the tenant state indicating that the tenant is activating the chatbot system, the content distribution service server apparatus 5 transmits a chatbot UI content that is a user interface screen for the chatbot to the personal computer 11 of the user (Step S59). The personal computer 11 of the user displays the chatbot UI content on the display unit via the Web browser (Step S60). Accordingly, the display unit displays an HP screen of the company including the chatbot UI. FIG. 13 is a diagram illustrating an example of the HP screen in a case where the chatbot system is activated. As illustrated in FIG. 13, if the chatbot system is activated, for example, a chat start button with a text of "start chat" is displayed on the HP screen. The user starts to use the chatbot by operating the chat start button.

When using the chatbot system, the user inputs a query via the chatbot UI (Step S61). The query is transmitted to the bot service server apparatus 2 (Step S62). Upon receiving the query, the bot service server apparatus 2 performs a chat process (Step S63).

Specifically, the bot service server apparatus 2 requests the storage service apparatus 7, the first database 4, and the search engine 6 to process the query from the user (Step S64 to Step S66). Then, if an answer to the query is obtained, the bot service server apparatus 2 transmits the answer to the personal computer 11 of the user (Step S67). Accordingly, the answer to the query of the user is displayed via the chatbot UI of the personal computer 11 of the user (Step S68).

Figure 14:
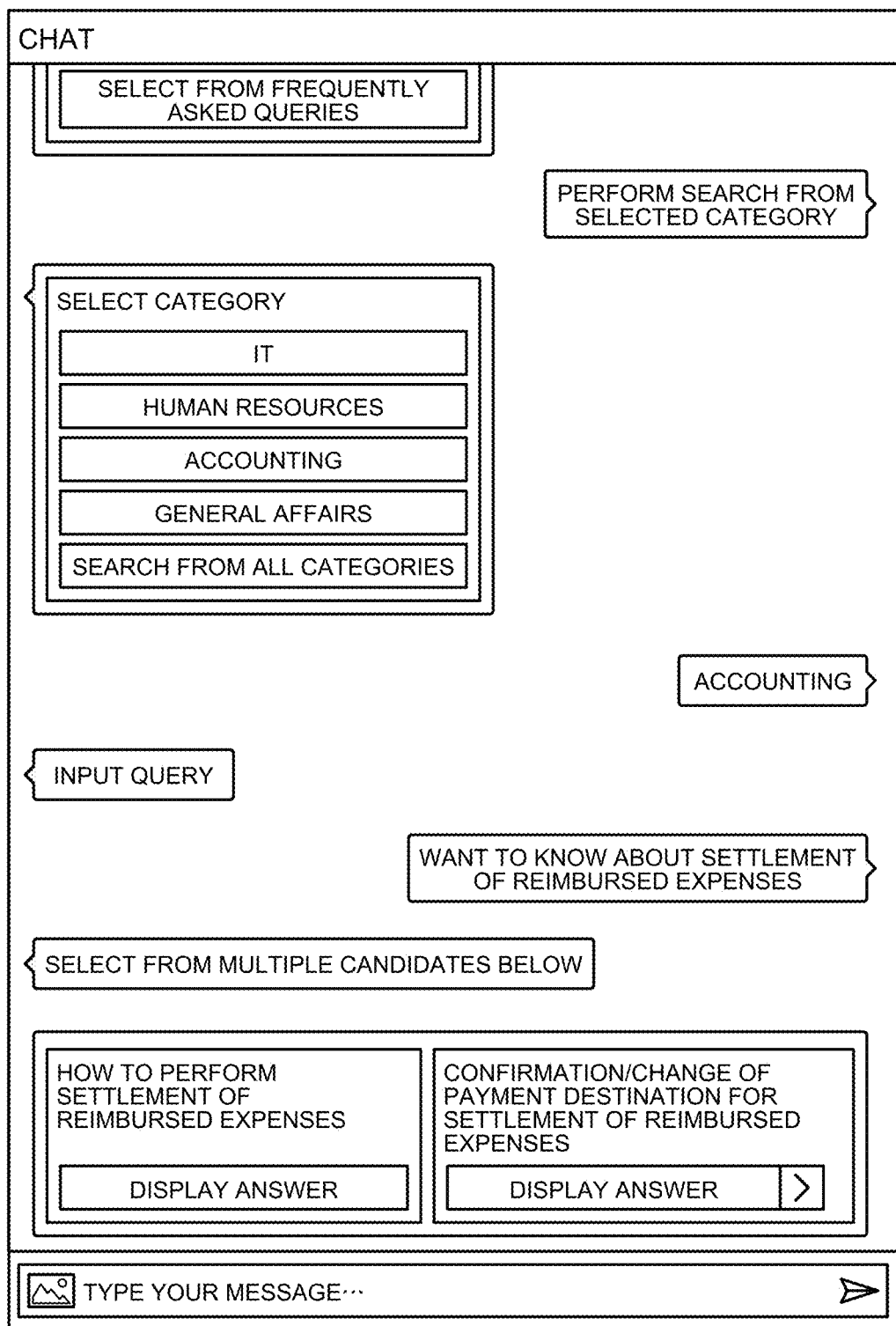
FIG. 14 is a diagram illustrating an example of a chat screen that is included in the chatbot system and that is displayed on the personal computer on the user side.

FIG. 14 is a diagram illustrating an example of a screen during chat. FIG. 14 illustrates an example of a chat screen in a case where the user selects a search method of "perform search from selected category" from a search method selection menu. In this case, as illustrated in FIG. 14, the user inputs text of "perform search from selected category" in the chat screen by using the personal computer 11 of the user.

Upon detecting input of the text of "perform search from selected category", the search engine 6 displays a list of category names of categories selectable by the user on the chat screen. In the example in FIG. 14, a list of category names of selectable categories, such as "IT (information technology)", "human resources", "accounting", "general affairs", and "search from all categories", is displayed on the chat screen.

For example, the user performs operation of inputting text of "accounting", and designates a category from which the user wants to perform search. If the user designates the category, the search engine 6 displays a message, such as "input query", for requesting input of a query on the chat screen and enters a query input wait state. Further, if the user designates the category, the search engine 6 acquires queries and answers corresponding to the designated category from the first database 4.

Specifically, if a search method of "search from all categories" as described above is selected, the search engine 6 performs a search with reference to queries and answers in all of categories stored in the first database 4. In contrast, if the user selects a category, the search engine 6 performs a search after acquiring queries and answers corresponding to the selected category from the first database 4. With this configuration, it is possible to reduce the amount of information on queries and answers to be searched through, so that it is possible to reduce a search time.

Subsequently, the user performs operation of inputting a query for the selected category. In the example in FIG. 14, the user inputs a query of "want to know about settlement of reimbursed expenses" for the category of "accounting".

In this manner, if the user inputs a text of the query, the search engine 6 performs a morphological analysis of the query of the user and detects a plurality of words included in the query of the user. Further, the search engine 6 searches for synonyms corresponding to the query of the user on the basis of each of the detected words. Then, the search engine 6 obtains an answer by referring to the queries and answers that correspond to the category selected by the user and that are acquired in advance from the first database 4, on the basis of the retrieved synonyms.

Subsequently, the search engine 6 determines whether a single candidate answer is retrieved, two or more candidate answers are retrieved, or no candidate answer is retrieved through the search for answers. If the single candidate answer is retrieved, the search engine 6 displays the retrieved answer and contact information to a help desk.

In contrast, if a plurality of candidate answers are retrieved, as illustrated in FIG. 14 for example, the search engine 6 displays a display selection button for each of the candidate answers, and displays a candidate answer designated by the display selection button. In the example in FIG. 14, candidate answers of "how to perform settlement of reimbursed expenses" and "confirmation/change of payment destination for settlement of reimbursed expenses" are displayed in response to the query of "want to know about settlement of reimbursed expenses" given by the user.

If a "no answer button" is operated, a search engine 15 displays the contact information to the help desk.

In contrast, if no candidate answer to the query of the user is detected, the search engine 6 displays a message for apology and request for re-search on the chat screen, and displays an initial screen (search method selection screen) of the chat screen on the personal computer 11 of the user.

When Tenant is Deactivating Chatbot System

In contrast, at Step S58, if the content distribution service server apparatus 5 is notified of the tenant state indicating that the tenant is deactivating the chatbot system, the content distribution service server apparatus 5 does not transmits the above-described chatbot UI content to the personal computer 11 of the user.

Figures 15, 16:
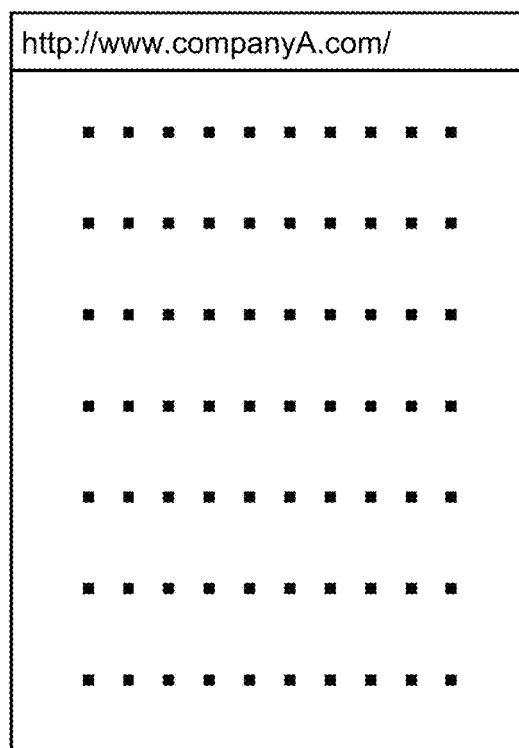
FIG. 15 is a diagram illustrating an example of a homepage that is provided by a company in which the chatbot system is deactivated and that is displayed on the personal computer on the user side.
FIG. 16 is a diagram illustrating an example of a tenant state table used in a second embodiment.

In this case, the HP screen of the company that does not include the chatbot UI as illustrated in FIG. 15 is displayed on the display unit of the personal computer 11 of the user (Step S69). Therefore, the user is unable to use the chatbot system.

Further, when a general user performs chat by using a communication tool (see FIG. 1) installed in the terminal device, it may be possible not to acquire the chatbot UI content as indicated from Step S51 to Step S59. In this case, at Step S62, if message information is transmitted, the bot service server apparatus 2 acquires the tenant state from the APP service server apparatus 1, and if the acquired tenant state indicates the activated state, the system performs the processes from Step S63 to Step S67. Further, in a case of the deactivated state, a transmitted message is not to be received and a message for notifying the user of the deactivated state is transmitted to and displayed on the Web browser, for example.

Effects of First Embodiment

As can be seen from the above description, the chatbot system according to the embodiment allows a contractor of the chatbot system (an administrator of a company) or an operation side of the chatbot system to easily perform operation of switching between activation and deactivation of the chatbot system; therefore, it is possible to flexibly cope with a use mode adopted by the contractor, a change performed by the operation side, and the like.

In a conventional chatbot system, it is necessary to continuously charge a monthly fee or it is necessary to terminate a contract when stopping the use of the system. However, in the chatbot system of the first embodiment, it is possible to allow the tenant to selectively use the chatbot system during only a period in which the tenant wants to use the system. Further, when stopping the use of the system, it is possible to back up the setting data by a data storage function of the storage service apparatus 7 or the like, and it is possible to resume the chatbot system by only clicking the resume button 200 once when resuming the system. Furthermore, it is possible to reduce an introduction cost of the chatbot system to the amount of use of the chatbot system, so that it is possible to encourage the company to introduce the chatbot system and it is possible to contribute to popularization of the chatbot system.

Moreover, some companies (or organizations or the like) receive lots of queries in a specific period of a year (busy period), but receive few queries in other periods. For example, a company that manufactures New Year's ornaments receives lots of queries from users during a busy period from November to January, but receives few queries during other periods. Similarly, a staffing service company receives lots of queries from users during a busy period from March to June, but receives few queries during other periods. When the busy period during which lots of queries are received as described above exists, and if the number of staffs to be employed is determined in accordance with the busy period, staff redundancy may occur in an off-season, which is not preferable from a business perspective.

By introducing the chatbot that automatically gives an answer to a query received from the user, it is possible to solve the problem with the staff redundancy in an off-season. In this case, as the costs for introducing the chatbot, the same amount of usage fees as that of the busy period is needed even in the off-season. This may reduce motivation of a company or the like that is going to introduce the chatbot, and may constitute an obstacle to popularization of the chatbot.

However, the chatbot system according to the embodiment is able to flexibly cope with a use mode of the chatbot system adopted by a contractor or the like, so that it is possible to improve motivation of the company or the like that is going to introduce the chatbot to introduce the chatbot, so that it is possible to contribute to popularization of the chatbot.

Second Embodiment

A chatbot system according to a second embodiment will be described below. In the first embodiment as described above, as illustrated in FIG. 7, only the tenant state information indicating the activated state or the deactivated state of each of tenants is stored and managed in the tenant state table in the first database 4. In contrast, in the second embodiment, activation period information for designating an activation period is stored in the tenant state table together with the tenant state information. Then, if the activation period comes, switching from the deactivated state to the activated state is automatically performed, and after a lapse of the activation period, switching from the activated state to the deactivated state is automatically performed.

The first embodiment and the second embodiment are different from each other only in terms of the above-described configuration. Therefore, hereinafter, only the difference between the first embodiment and the second embodiment will be described and the same explanation will not be repeated.

FIG. 16 is a diagram illustrating an example of a tenant state table that is stored in the first database 4 and used in the second embodiment. In the second embodiment, as illustrated in FIG. 16, the activation period information is stored, for each of tenants, in the tenant state table together with the tenant state information indicating the activated state or the deactivated state. In the example illustrated in FIG. 16, it is indicated that the corporation A is not currently using the chatbot system and enters the activated state during a period from December $1^{st}$ to January $31^{st}$. Further, the corporation C is currently using (activating) the chatbot system and enters the activated state during a period from October $1^{st}$ to November $30^{th}$. The corporation B is currently using (activating) the chatbot system and the activation period is not set.

The APP service server apparatus 1 recognizes a period during which the tenant uses the chatbot system on the basis of the activation period information in the tenant state table, and if the activation period indicated by the activation period information comes, the APP service server apparatus 1 causes each of the units to enter the activated state as described at Step S36 in FIG. 11. Further, after a lapse of the activation period indicated by the activation period information, the APP service server apparatus 1 causes each of the units to enter the deactivated state as described at Step S11 in FIG. 6.

Therefore, the tenant side need not perform operation of manually switching the tenant state and can achieve the same effects as those of the first embodiment as described above.

Meanwhile, for example, the APP service server apparatus 1 may include manual operation, such as automatically switching the tenant state of the chatbot system of the tenant to the activated state when the activation period comes and allowing the administrator to operate the deactivation button 100 to deactivate the system when stopping using the system.

Further, the APP service server apparatus 1 may transmit an electronic mail (e-mail) indicating a start of the activation period to the personal computer 12 of the administrator a few days before the start of the activation period, and the administrator who has received the e-mail may start to use the chatbot system by operating the resume button 200 when the activation period comes. Similarly, the APP service server apparatus 1 may transmit an e-mail indicating an end of the activation period to the personal computer 12 of the administrator a few days before the end of the activation period, and the administrator who has received the e-mail may stop using the chatbot system by operating the deactivation button 100 when the activation period ends.

Further, after a lapse of the activation period, it may be possible to automatically switch the activated state to the first state or the second state. Furthermore, it may be possible to set a to-be-switched state (a state to which the system will be switched) for each of tenants, and switch the state based on a setting value of the tenant.

Modification of Second Embodiment

As illustrated in FIG. 17, it may be possible to allow for designation of a preparation period in which only the administrator tool is activated. In the example illustrated in FIG. 17, the corporation A selects a first activation mode (first activated state) in which only the administrator tool is activated, designates a period from December $1^{st}$ to January $31^{st}$ as the activation period, and designates a period from November $1^{st}$ to November $30^{th}$ as the preparation period. In this case, the APP service server apparatus 1 activates only the administrator tool during the preparation period.

Specifically, in the case of the corporation A, the system enters the first state when the preparation period starts, the system enters the activated state when the activation period starts, and the system enters the second state after a lapse of the activation period. Further, like the corporation C, it may be possible not to set the preparation period and not to perform switching to the first state. Furthermore, like the corporation B, it may be possible not to designate a period, but to allow switching using the administrator tool. Moreover, it may be possible to allow for automatically switching between the states in accordance with a period set in advance, or it may be possible to allow the administrator to operate the administrator tool for switching between the states.

In the example illustrated in FIG. 17, the tenant state of the corporation B indicates that the chatbot system is deactivated. Further, in the example illustrated in FIG. 17, the tenant state of the corporation C indicates that a second activation mode (second activated state) in which all of the functions of the chatbot system are activated is selected.

According to an embodiment, it is possible to automatically switch between the activated state and the deactivated state of the chatbot system, and flexibly cope with a use mode as desired by the contractor side.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising circuitry configured to
receive message information from a terminal device, and transmit responding message information to the terminal device based on setting information in which query information and answer information are associated with each other,
receive change operation for changing at least one of the query information and the answer information included in the setting information,
switch a state between a first state and a second state, the first state being a state in which the message information is to be received from the terminal device and a change of the setting information is to be received, the second state being a state in which the message information is not to be received and a change of the setting information is to be received, and
when switching from the second state to the first state is performed, transmit the responding message information to the terminal device based on the setting information for which the change has been received in the second state before the switching is performed.

2. The information processing apparatus according to claim 1, further comprising:
a storage unit configured to store the state switched by the circuitry and contractor identification information for identifying a contractor in association with each other, wherein
the circuitry is configured to receive message information from the terminal device based on the state corresponding to the contractor identification information transmitted from the terminal device.

3. The information processing apparatus according to claim 2, wherein
the circuitry is further configured to receive switching operation for switching the state, the switching operation being performed by the contractor, and
the circuitry is configured to switch the state in accordance with the received switching operation.

4. The information processing apparatus according to claim 2, wherein
the storage unit is configured to store the contractor and a period of the first state in association with each other, and
the circuitry is configured to switch the state corresponding to the contractor based on the period of the first state corresponding to the contractor.

5. The information processing apparatus according to claim 4, wherein
the circuitry is configured to switch the state among a third state, the first state, and the second state, the third state being a state in which the message information is not to be received and the change of the setting information is not to be received,
the storage unit is configured to store the contractor, a period of the first state, and a period of the second state in association with one another, and
the circuitry is configured to switch the state corresponding to the contractor based on the period of the first state and the period of the second state corresponding to the contractor.

6. The information processing apparatus according to claim 2, wherein
the circuitry is further configured to transmit, to the terminal device, content information for inputting the message information in the terminal device, and the circuitry is configured to
- receive the message information input based on the content information and received from the terminal device, and
- when the state corresponding to the contractor identification information transmitted from the terminal device is the second state, not to transmit the content information to the terminal device.

7. An information processing method implemented by an information processing system configured to communicate with a terminal device and transmit message information responding to received message information, the information processing method comprising:
- controlling, by circuitry, including receiving message information from a terminal device, and transmitting the responding message information to the terminal device based on setting information in which query information and answer information are associated with each other;
- receiving, by the circuitry, change operation for changing at least one of the query information and the answer information included in the setting information; and
- switching, by the circuitry, a state between a first state and a second state, the first state being a state in which the message information is to be received from the terminal device and a change of the setting information is to be received, the second state being a state in which the message information is not to be received and a change of the setting information is to be received, wherein
- at the controlling, when switching from the second state to the first state is performed, the responding message information is transmitted to the terminal device based on the setting information for which a change has been received in the second state before the switching is performed.

8. The information processing method according to claim 7, further comprising:
- storing the state switched by the circuitry and contractor identification information for identifying a contractor in association with each other, wherein
- at the controlling, message information from the terminal device is received based on the state corresponding to the contractor identification information transmitted from the terminal device.

9. The information processing method according to claim 8, further comprising:
- receive switching operation for switching the state, the switching operation being performed by the contractor, wherein
- at the switching, the state is switched in accordance with the received switching operation.

10. The information processing method according to claim 8, wherein
- at the storing, the contractor and a period of the first state are stored in association with each other, and
- at the switching, the state corresponding to the contractor is switched based on the period of the first state corresponding to the contractor.

11. The information processing method according to claim 10, wherein
- at the switching, the state is switched among a third state, the first state, and the second state, the third state being a state in which the message information is not to be received and the change of the setting information is not to be received,
- at the storing, the contractor, a period of the first state, and a period of the second state are stored in association with one another, and
- at the switching, the state corresponding to the contractor is switched based on the period of the first state and the period of the second state corresponding to the contractor.

12. The information processing method according to claim 8, further comprising:
- providing content including transmitting, to the terminal device, content information for inputting the message information in the terminal device, wherein
- at the controlling, the message information input based on the content information and received from the terminal device is received, and
- at the providing, when the state corresponding to the contractor identification information transmitted from the terminal device is the second state, the content information is not transmitted to the terminal device.

13. An information processing system comprising:
- a terminal device including first circuitry; and
- an information processing apparatus including second circuitry, wherein
- the first circuitry is configured to
  - receive message information input by a user,
  - transmit the message information input by the user to the information processing apparatus
- the second circuitry is configured to
  - receive the message information from the terminal device, and transmit the responding message information to the terminal device based on setting information in which query information and answer information are associated with each other,
  - receive change operation for changing at least one of the query information and the answer information included in the setting information, and
  - switch a state between a first state and a second state, the first state being a state in which the message information is to be received from the terminal device and a change of the setting information is to be received, the second state being a state in which the message information is not to be received and a change of the setting information is to be received, and
  - when switching from the second state to the first state is performed, transmit the responding message information to the terminal device based on the setting information for which the change has been received in the second state before the switching is performed.

14. The information processing system according to claim 13, further comprising:
- a storage unit configured to store the state switched by the circuitry and contractor identification information for identifying a contractor in association with each other, wherein
- the second circuitry is configured to receive message information from the terminal device based on the state corresponding to the contractor identification information transmitted from the terminal device.

15. The information processing system according to claim 14, wherein
- the second circuitry is further configured to receive switching operation for switching the state, the switching operation being performed by the contractor, and
- the second circuitry is configured to switch the state in accordance with the received switching operation.

16. The information processing system according to claim 14, wherein
the storage unit is configured to store the contractor and a period of the first state in association with each other, and
the second circuitry is configured to switch the state corresponding to the contractor based on the period of the first state corresponding to the contractor.

17. The information processing system according to claim 16, wherein
the second circuitry is configured to switch the state among a third state, the first state, and the second state, the third state being a state in which the message information is not to be received and the change of the setting information is not to be received,
the storage unit is configured to store the contractor, a period of the first state, and a period of the second state in association with one another, and
the second circuitry is configured to switch the state corresponding to the contractor based on the period of the first state and the period of the second state corresponding to the contractor.

18. The information processing system according to claim 14, wherein
the second circuitry is further configured to transmit, to the terminal device, content information for inputting the message information in the terminal device, and
the second circuitry is configured to
receive the message information input based on the content information and received from the terminal device, and
when the state corresponding to the contractor identification information transmitted from the terminal device is the second state, not to transmit the content information to the terminal device.

* * * * *